United States Patent [19]

Klett et al.

[11] Patent Number: 4,570,859

[45] Date of Patent: Feb. 18, 1986

[54] FOAM DISPENSER FOR GLASS MAT SUBSTRATE

[75] Inventors: Paul A. Klett, Newark; Shiv K. Bakhshi, Columbus; Mark A. Granger, Newark, all of Ohio

[73] Assignee: Owens-Corning Fiberglas Corporation, Toledo, Ohio

[21] Appl. No.: 576,999

[22] Filed: Feb. 6, 1984

[51] Int. Cl.[4] .............................................. B05B 1/32
[52] U.S. Cl. ..................... 239/455; 239/562; 137/863; 137/869; 251/61.1
[58] Field of Search ............. 222/481, 512, 544, 545, 222/569; 137/863, 866, 869; 251/61.1, DIG. 2; 138/93; 239/533.15, 566, 565, 451, 455, 443, 562, 561

[56] References Cited

U.S. PATENT DOCUMENTS

| 650,832 | 6/1900 | Gilain | 251/61.1 |
| 3,732,888 | 5/1973 | Convain et al. | 251/61.1 |
| 4,121,621 | 10/1978 | Zimmerman | 137/863 |
| 4,272,021 | 6/1981 | Standal | 251/61.1 |

FOREIGN PATENT DOCUMENTS

| 2223449 | 11/1973 | Fed. Rep. of Germany | 222/544 |
| 567538 | 2/1945 | United Kingdom | 239/455 |
| 1026854 | 4/1966 | United Kingdom | 239/533.15 |

Primary Examiner—H. Grant Skaggs
Attorney, Agent, or Firm—Ronald C. Hudgens; Ted C. Gillespie

[57] ABSTRACT

A dispenser is disclosed, the dispenser comprising a head adapted with one or more expandable members to regulate the quantity of flow from the head.

5 Claims, 3 Drawing Figures

FOAM DISPENSER FOR GLASS MAT SUBSTRATE

This invention relates to dispensers. In one of its more specific aspects, this invention relates to dispensers in the form of apertured applicators for dispensing one or more materials.

BACKGROUND OF THE INVENTION

In dispensing materials such as coatings, saturants and the like into substrates, it is the usual practice to employ a dispensing head, comprised of a chamber into which the material to be dispensed is introduced and from which it is emitted through one or more apertures in the wall of the chamber.

Typical of such apparatus are dispensing heads which dispense foams, colorants, glues, and the like, onto the surface, or into the interior, of such materials as glass mats, boards, and the like.

Frequently, it is desired to dispense such materials in irregular patterns or in differing quantities across the substrate. For example, it may be desirable to alter the path laid down by the material dispensed by dispensing the material in a first path and then in a second path laterally displaced from the first path. For such purposes, there is needed a method of curtailing or eliminating flow from selected apertures in the dispensing heads.

The apparatus of this invention provides a means for doing so.

STATEMENT OF THE INVENTION

According to this invention there is provided dispensing apparatus comprising a chamber having an apertured dispensing wall, a conduit opening into the chamber for the introduction of a dispensable material thereunto, and expandable means positioned within the chamber, the expandable means being expandable to substantially eliminate the dispensing of the material through at least a portion of the apertured wall of the chamber by the closing of the apertures.

In an embodiment of the invention, a plurality of expandable means are positioned within the chamber.

In another embodiment of the invention, resilient means, such as a flexible and pliable substance, is positioned between the expandable means and the apertures of the apertured wall.

DESCRIPTION OF THE INVENTION

Figure 1:
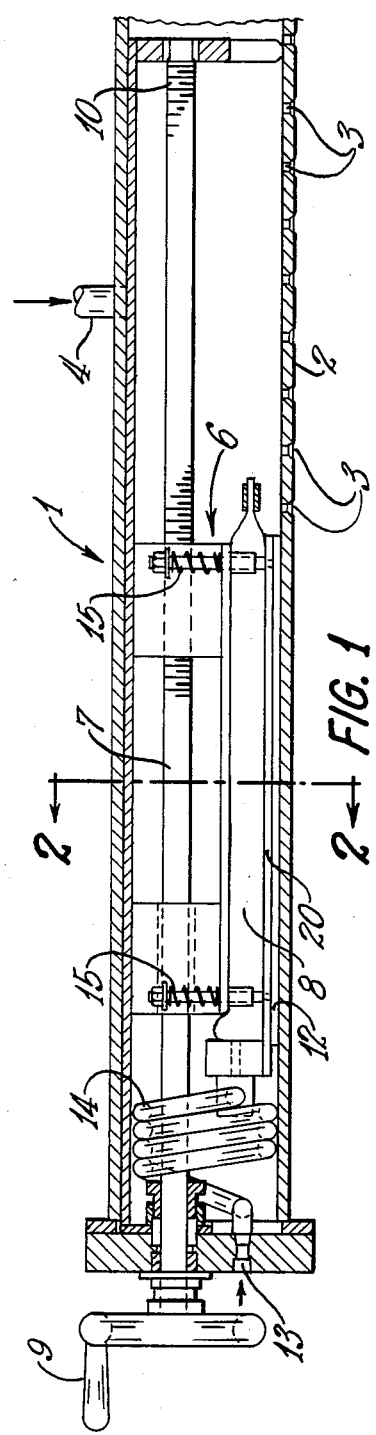
FIG. 1 is a depiction of a single expandable means within a dispensing head.
Figure 2:
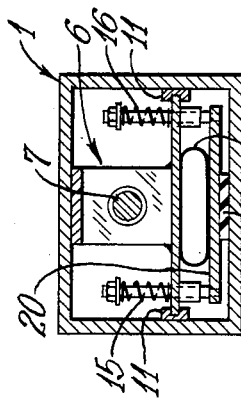
FIG. 2 is a cross section taken through section 2—2 of FIG. 1.

Referring now to FIGS. 1 and 2, there is shown chamber, or dispensing head 1, having an apertured dispensing wall 2, apertures 3 being positioned therein. The dispensing head is adapted with conduit 4 opening thereunto for the introduction of the material to be dispensed through the apertures.

Positioned within the head is carrier 6 comprising a support shaft 7 on which the expandable member 8 is carried in any suitable manner. The expandable member is positionable along the length of the head by means of crank 9 which acts to move the carrier along threaded shaft 10. The expandable member is carried, for example, on side track and supports 11 and is expandable downward therebetween. Positioned between the expandable member and the apertures can be resilient member, or gasket, 12. Upon expansion of the expandable member downward by the introduction of a fluid through inlet 13 and hose 14, a compressible member such as gasket 12 is forced against the outlet apertures to substantially limit flow therethrough from the head to any desired rate, including total shut-off.

Affixed to the gasket is plate 20 which, in turn, is carried on springs 15 and 16. Upon inflation of the expandable member, these springs are placed in compression as the gasket and plate move against the apertures. Upon deflation of the expandable member, the expandable member moves away from the apertures, and the springs relax such that the plate moves upwardly carrying the gasket with it to open flow through the apertures from the dispenser.

Figure 3:
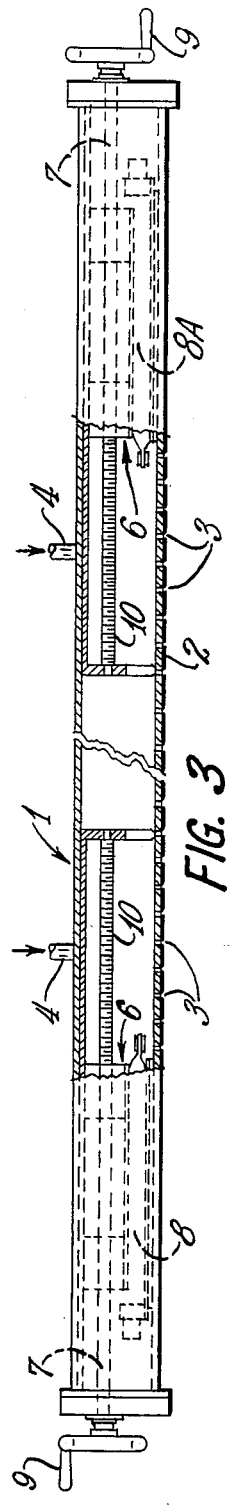
FIG. 3 is a depiction of a second embodiment of the apparatus of this invention.

Referring to FIG. 3, there is shown a plurality of expandable members 8 and 8A carried on a common, but extended, carrier 6. The second expandable member 8A, is adapted in a manner similar to that of a single carrier of FIG. 1 with the total length of the carrier being less than, equal to, or the width of the dispenser, thus enabling the carrier to be positioned at any point along the width of the head. If desired, a second and independent fluid inlet can be affixed to each expandable member to inflate the members independently of each other and provision can be supplied to move the members individually along the longitudinal axis of the dispenser.

In a related mannner, the chamber can be departmentalized such that from each compartment is dispensed a different material, the expandable member being arbitrarily positioned in each compartment.

Any suitable expandable member can be employed in this invention. One suitable member is a pressure power unit called the "Windjammer" available from Merriman Products, Inc., Jackson, Mich. The expandable member will not be of such a size as to limit the flow of the dispensant through the dispensing head.

It will be evident from the foregoing that various modifications can be made to this invention. Such, however, are considered within the scope of the invention.

We claim:

1. A dispensing head for dispensing foam into a glass mat substrate comprising:
    (a) an elongated chamber having an apertured wall facing said glass mat substrate, said elongated chamber being positioned across the width of said glass mat substrate;
    (b) a conduit opening into said chamber for the introduction of a foam thereinto; and
    (c) expandable means positioned within said chamber, said means being expandable to restrict flow of said foam material through said apertures, and said expandable means being moveable within said chamber across the width of said glass mat substrate to control the number of apertures through which the flow of foam is restricted to thereby control the width of foam applied to said glass mat substrate.

2. The apparatus of claim 1 in which a plurality of expandable means are positioned within said chamber.

3. The apparatus of claim 2 in which said expandable means are individually positionable along said axis.

4. The apparatus of claim 2 in which said expandable means are individually expandable.

5. The apparatus of claim 2 in which said chamber is sub-divided into compartments and an expandable means is positioned within each compartment.

* * * * *